(12) United States Patent
Cresseaux

(10) Patent No.: US 6,267,430 B1
(45) Date of Patent: Jul. 31, 2001

(54) SLIDE RAIL FOR REMOVABLE VEHICLE SEAT

(75) Inventor: Gilles Cresseaux, St Georges des Groseillers (FR)

(73) Assignee: Bertrand Faure Equipments SA, Boulogne (FR)

(*) Notice: Subject to any disclaimer, the term of this patent is extended or adjusted under 35 U.S.C. 154(b) by 0 days.

(21) Appl. No.: 09/501,915

(22) Filed: Feb. 10, 2000

(30) Foreign Application Priority Data

Feb. 25, 1999 (FR) .................................................. 99 02348

(51) Int. Cl.⁷ ..................................................... B60N 2/02
(52) U.S. Cl. .................................... 296/65.13; 296/65.01; 296/63.02; 296/65.14; 297/250.1; 297/344.13; 297/477
(58) Field of Search ............................. 296/65.13, 65.01, 296/65.02, 65.14; 297/250.1, 344.13, 477

(56) References Cited

U.S. PATENT DOCUMENTS

| | | | |
|---|---|---|---|
| 3,632,059 | * | 1/1972 | Loose ................................... 297/477 |
| 4,043,427 | | 8/1977 | Ackerman .............................. 187/12 |
| 4,223,916 | * | 9/1980 | Tillac ................................... 280/806 |
| 4,285,545 | * | 8/1981 | Protze ................................. 296/65.01 |
| 4,515,404 | * | 5/1985 | Nishimura et al. ................ 296/65.14 |
| 4,564,241 | | 1/1986 | Holz et al. ............................. 299/43 |
| 4,655,477 | * | 4/1987 | Takada .................................. 280/804 |
| 4,727,569 | | 2/1988 | Kutrieb et al. ......................... 379/58 |
| 4,754,105 | * | 6/1988 | Doty et al. ........................ 200/61.58 |
| 4,844,359 | | 7/1989 | Kato .................................. 242/54 R |
| 5,213,388 | * | 5/1993 | Baker ................................ 296/65.13 |
| 5,275,369 | * | 1/1994 | Kamata et al. .................... 296/65.13 |
| 5,353,209 | * | 10/1994 | Foottit .................................. 362/226 |
| 5,527,094 | * | 6/1996 | Hiramatsu et al. ................ 297/250.1 |
| 5,616,037 | * | 4/1997 | Lorraine et al. ..................... 439/130 |
| 5,676,341 | * | 10/1997 | Tarusawa et al. ................ 296/65.13 |
| 5,762,617 | * | 6/1998 | Infanti ............................. 297/344.13 |
| 5,876,085 | * | 3/1999 | Hill .................................. 296/65.02 |
| 6,050,629 | * | 4/2000 | Bernardt et al. .................. 296/65.01 |
| 6,053,529 | * | 4/2000 | Frusti et al. ....................... 296/65.13 |
| 6,161,891 | * | 12/2000 | Blakesley .......................... 296/65.01 |
| 6,186,809 | * | 1/2001 | Kung .................................... 439/248 |
| 6,203,088 | * | 3/2001 | Fernandez et al. ................ 296/37.8 |

FOREIGN PATENT DOCUMENTS

| | | |
|---|---|---|
| 29 05 235 | 2/1979 | (DE) . |
| 32 24 591 | 7/1982 | (DE) . |
| 0 609 130 | 8/1994 | (EP) . |
| 2 758 502 | 7/1998 | (FR) . |

OTHER PUBLICATIONS

French Preliminary Search Report, Oct. 28, 1999, Appl. No. FR 9902348.

* cited by examiner

Primary Examiner—Joseph D. Pape
Assistant Examiner—Kiran B. Patel
(74) Attorney, Agent, or Firm—Marshall, O'Toole, Gerstein, Murray & Borun

(57) ABSTRACT

A slide rail for a removable vehicle seat comprises a fixed section and a shuttle sliding on this section. The shuttle carries a connector connected to the seat, and this connector is connected to an electrical circuit belonging to the vehicle floor by means of a flexible electrical cabling which is arranged under a flange of the fixed section and which is held taut by a resilient return drum.

8 Claims, 2 Drawing Sheets

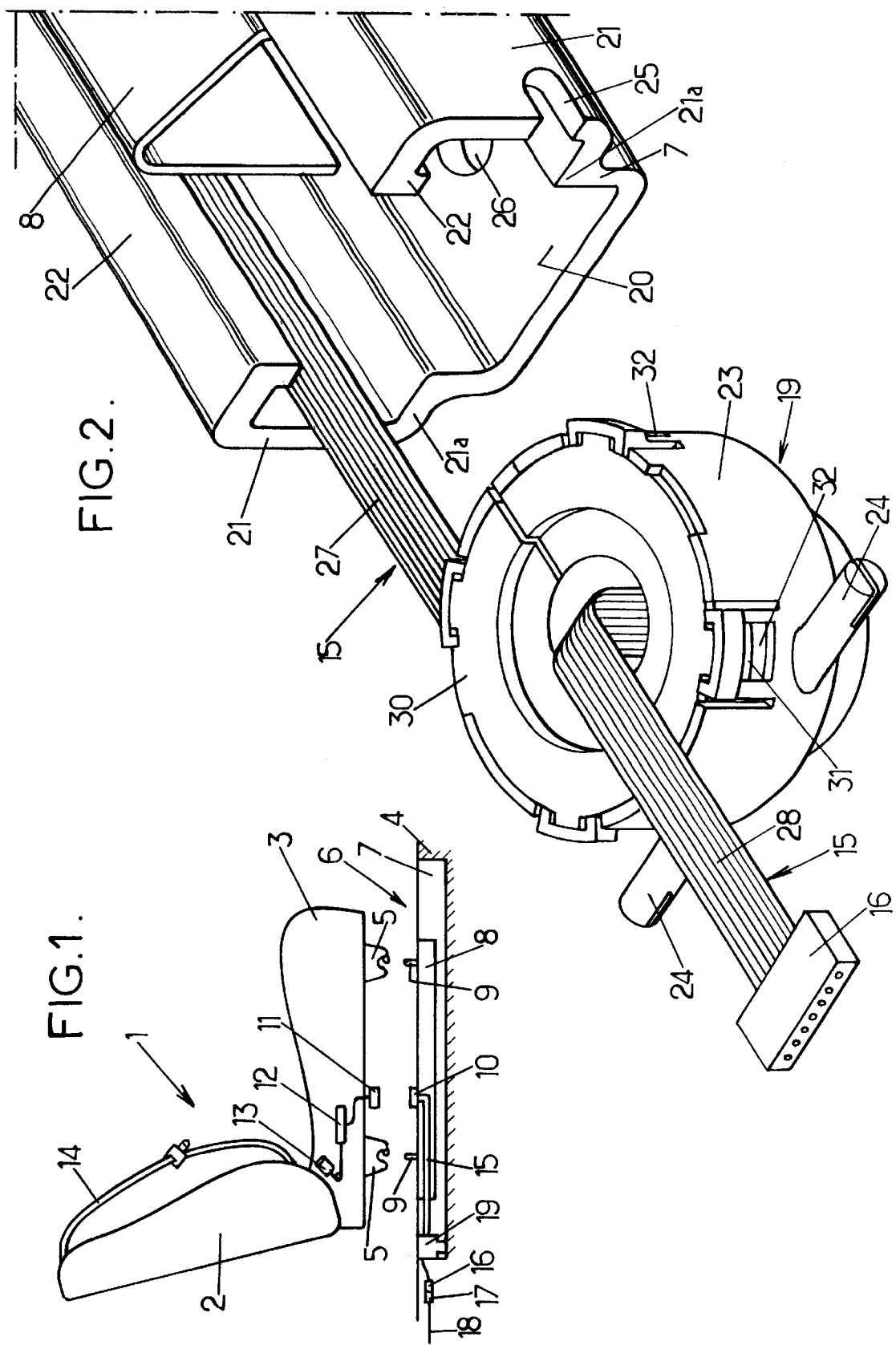

SLIDE RAIL FOR REMOVABLE VEHICLE SEAT

FIELD OF THE INVENTION

The present invention relates to slide rails for removable seats of vehicles.

More particularly, the invention relates to a slide rail for a removable vehicle seat comprising:

- a fixed section intended to be fixed with the vehicle floor and along which the seat can slide, this fixed section comprising first and second longitudinal ends and having at least one flange under which a free space is delimited, said flange extending from the first end to near the second end of the fixed section,
- and at least one shuttle sliding mounted relative to the fixed section and adapted to be connected to the vehicle seat so as to follow the movement of the seat along said fixed section.

By removable seat, it is understood here a seat which can be entirely removed from the vehicle, or which can at least be moved so as to free a large part of the vehicle floor zone normally situated under the seat (it can relate to for example a tipping seat in the approximately vertical position or "pocket book" position).

BACKGROUND OF THE INVENTION

Because the seats carried by these slide rails are removable, it is not conceivable to electrically supply these seats by means of a cable layer or of a bundle of cables left free on the vehicle floor under the seat part of the seat, as is the case for non-removable seats. Indeed, this layer or this bundle of cables would be in the way and would be able to be damaged by the passengers of the vehicle when the seat frees the floor zone normally situated under it.

Removable seats of this type do not therefore generally include any electrical equipment, so that they have less functionality than non-removable seats.

OBJECTS AND SUMMARY OF THE INVENTION

The present invention has the particular object of overcoming this drawback, by proposing means for simply and in a sure manner achieving the electrical connection of a removable seat which is mounted on at least one slide rail and which comprises at least one piece of electrical equipment.

To this end, according to the invention, in a slide rail of the type defined above, intended for such a removable vehicle seat, the shuttle carries an electrical connecting device intended to be connected to the seat, and in that the electrical connection device carried by said shuttle is itself connected to an electrical circuit integral with the vehicle floor at the first longitudinal end of the fixed section, by means of a flexible electrical cabling which is set under the flange of the fixed section and which is held taut by a resilient return drum.

As a result of these features, the flexible electrical cabling remains permanently hidden under the upper flange of the fixed section, so that this cabling does not hinder the users of the vehicle and does not risk being damaged by them when the seat is removed or moved in order to free the floor.

In preferred embodiments of the invention, one and/or other of the following features may be incorporated:

- the flexible cabling is constituted by a layer of cables in the form of a ribbon;
- the resilient return drum comprises:
  - an inner fixed drum, fixed with the fixed section so as not to be able to rotate,
  - a hollow movable drum which surrounds the fixed drum and which is mounted to rotate relative to the fixed drum,
  - resilient means acting on the movable drum in a first angular direction,
  - the flexible cabling having a first fixing point fixed with the movable drum, and said flexible cabling being subdivided into:
    - a first cabling section which extends around the fixed drum in a second angular direction opposite to the first angular direction from said first fixing point,
    - and a second cabling section which extends around the movable drum in the second angular direction from said first fixing point;
  - the first cabling section extends to a second fixing point which is fixed (directly or indirectly) with the fixed drum;
  - the movable drum is surrounded by a casing integral with the fixed drum;
  - the resilient return drum is fixed (directly or indirectly) with the vehicle floor;
  - the resilient return drum is fixed with the shuttle;
  - the slide rail fixed section has an approximately U-shaped section open upwards, with two approximately vertical lateral flanges each extended inwards by an approximately horizontal flap, one of these flaps constituting the flange under which the flexible cabling is housed.

BRIEF DESCRIPTION OF THE DRAWINGS

Other characteristics and advantages of the invention will appear during the following description of two of its embodiments, given as non-restrictive examples, in comparison with the attached drawings. On the drawings:

FIG. 1 is a diagrammatic view of an automobile vehicle removable seat mounted on the vehicle floor by means of a slide rail according to a first embodiment of the invention, FIG. 2 is an exploded perspective view of a part of the slide rail visible in FIG. 1.

MORE DETAILED DESCRIPTION

Figure 3:
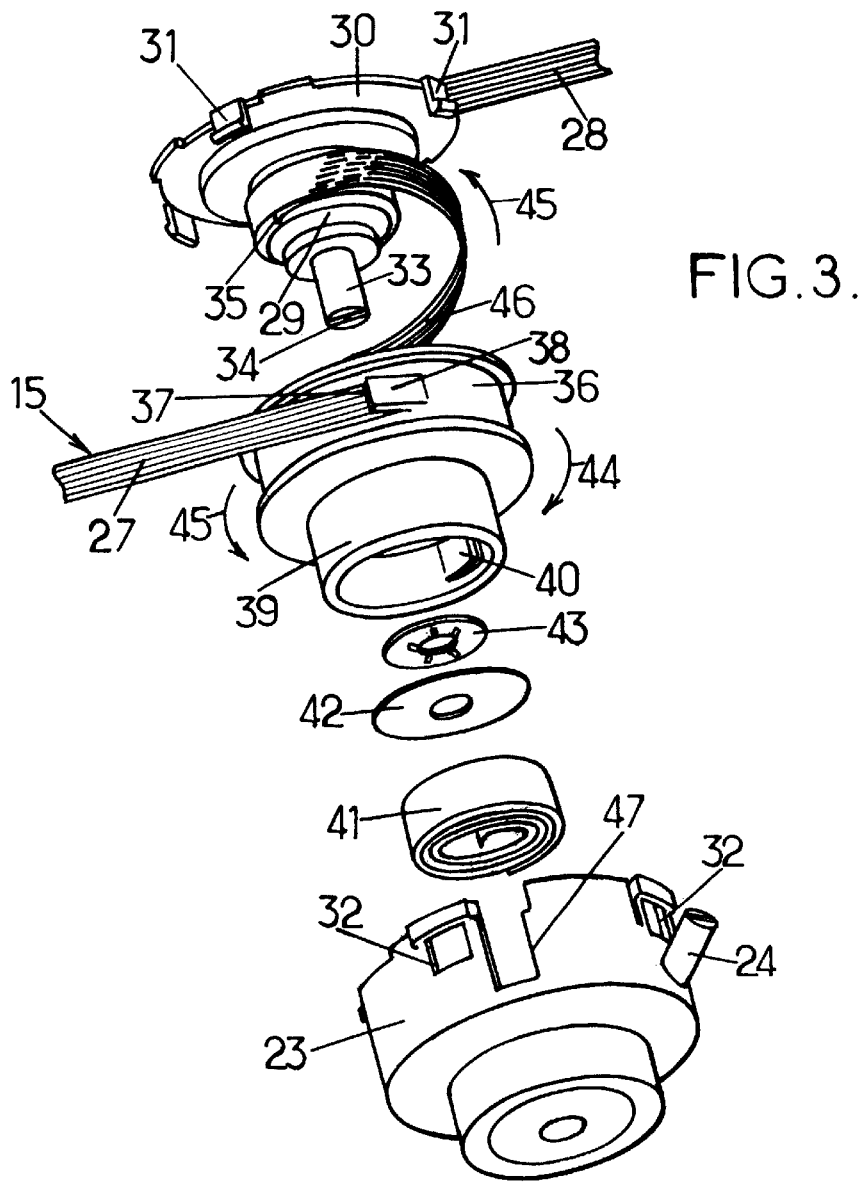
FIG. 3 is an exploded perspective view of a resilient return drum equipping the slide rail of FIG. 2.

In the different figures, the same references designate identical or similar components.

FIG. 1 shows an automobile vehicle seat, intended in particular to equip the rear places of a modular passenger cell vehicle, of the type currently called "people-carrier".

This seat comprises a back 2 carried by a seat part 3, which rests on the vehicle floor 4 by means of four feet 5, of which two are visible in FIG. 1. These feet 5 are adapted to be mounted in a removable manner in itself well known, on two parallel metal slide rails 6, of which only one is visible in FIG. 1.

Each of the slide rails 6 comprises on the one hand, a fixed section 7 which is fixed with the vehicle floor 4, and on the other hand, a shuttle 8 sliding mounted on the fixed section.

In the particular example shown in the drawings, the shuttle 8 of each slide rail 6 comprises two rigid rings 9 on which the two feet 5 situated on the same side of the seat can be locked, this shuttle 8 comprising moreover a catch (itself known) controlled by the user of the seat to selectively immobilise or free the shuttle in order to adjust the position of the seat 1.

In addition, the shuttle 8 of one of the slide rails 6 comprises an electrical connector 10 adapted to be connected to a complementary connector 11 connected to the seat electrical equipment.

This electrical equipment comprises in this case at least one seat belt pre-tensioner 12 which is connected to one of the lower fastening points 13 of the seat belt 14 in order to tension said belt in the event of an accident being sustained by the vehicle. But the seat should be able to comprise other electrical equipment, for example electrical adjustment devices, an electrical heating device, a ventilation device, sensors, etc.

It will be noted, in the framework of the present invention, it is not essential that the shuttle 8 supports the seat feet 5: the feet 5 could possibly be able to designed to be directly sliding mounted on the fixed section 7 of the slide rail, in which case a shuttle 8 would be necessary only on one of the slide rails 6 in order to carry the connector 10 following the sliding movement of the seat on the fixed section.

The electrical connector 10 carried by the shuttle 8 is connected to a flexible electrical cabling 15 which extends inside the fixed section as far as a connector 16 situated in the floor 4, towards one of the ends of the fixed section 7. This connector 16 is connected to a complementary connector 17 itself connected to at least one fixed electrical circuit 18, integrated in the vehicle floor 4.

The flexible cabling 15 is to advantage (but not necessarily) constituted by a layer of cables in the form of a ribbon, and this cabling is partially wound in a resilient return drum 19.

As shown in FIG. 2, the fixed section 7 of each slide rail 6 can have an approximately U-shaped section open upwards, with a bottom 20 and two lateral flanges 21 which extend upwards from the bottom 20 to an upper flap 22. This flap 22 extends horizontally to the inside of the fixed section 7, in a continuous or approximately continuous manner over approximately all the length of the fixed section.

Moreover, in the particular example shown, each shuttle 8 also has the form of a U section open downwards, which is engaged in the space between the two upper flaps 22 of the fixed section. This shuttle 8 can for example be sliding mounted on the fixed section 7 for example by means of rollers (not shown) which roll on upwards directed lateral shoulders 21a formed inside the flanges 21 of the fixed section.

As for the drum 19, it comprises in the example considered an external rigid casing 23 of general cylindrical shape open upwards, which is made for example in plastic material and which has two external projecting rods 24 engaged in two notches 25 formed at one end of the fixed section 7 of one of the slide rails, the casing 23 being able moreover to be screwed onto the fixed section 7, for example through a hole 26 made in the bottom of said fixed section.

From the casing 19, a section 27 of the flexible cabling 15 extends towards the shuttle 8 under one of the flanges 22 of the fixed section, this flexible cabling passing on the side of the shuttle 8 and then passing under the upper wall of the shuttle 8, before being connected to the connector 10 carried by the shuttle.

When the user of the seat moves the shuttle 8 so as to adjust the longitudinal position of his seat, the section 27 of the flexible cabling 15 follows this movement by winding in the drum 19 or unwinding from said drum. The section 27 of the flexible cabling is thus held permanently taut by the resilient drum 19, so that this section 27 remains perfectly hidden under the flange 22 of the fixed section and protected by this.

Moreover, the flexible cabling 15 comprises also a fixed section 28, which connects the drum 19 to the connector 16 connected to the fixed cabling 18 of the vehicle floor.

As shown in FIG. 3, the resilient return drum 19 comprises, in the example considered, an inner fixed drum 29 which has a cylindrical shape centred on a vertical axis and which is integral with a cover 30 covering the upper opening of the casing 23.

The cover 30 is rigidly fixed to the casing 23 by clipping flexible tabs 31 of said cover in corresponding housings 32 made near the upper edge of the casing 23.

Moreover, the fixed drum 29 is extended downwards by a foot 33 which is provided with a slit 34 the use of which will be seen later.

Finally, the fixed drum 29 is provided with one or several slits 35 which are passed through by the flexible cabling 15 and in which said cabling is fixed, the section 28 of this cabling extending towards the outside of the drum 19 from said slits 35.

In addition to the fixed drum 29, the drum 19 comprises moreover a hollow movable drum 36 which surrounds the fixed drum and which is mounted to rotate relative to said fixed drum and the casing 23.

This movable drum comprises a slit 37 which is passed through by the flexible cabling 15, a resilient tab 38 of the movable drum clamping the flexible cabling by immobilising it where it passes through the slit 37.

Moreover, the movable drum 36 is extended downwards by a cylindrical annular lateral wall 39 which is provided with a tab 30 engaging with resilient return means of said movable drum.

These resilient return means are constituted in this case by a helicoidal spring 41 arranged inside the annular wall 39, with the interposition of washers 42, 43 between said spring and the flexible cabling wound on the fixed drum.

One of the ends of the helicoidal spring 41 is fixed on the tab 40 of the movable drum, whereas the other end of the spring is fixed in the slit 34 of the foot 33 of the fixed drum.

The spring 41 acts on the movable drum 36 in a first angular direction 44, so that the section 27 of the flexible cabling winds around the movable drum 36 in the opposite angular direction 45 from the fixing point of said cabling situated in the slit 37.

From this fixing point of the flexible cabling situated at the slit 37, said cabling is extended inside the movable drum 36 by a cabling section 46 which is wound around the fixed drum 29 also in the angular direction 45 under the effect of the above mentioned spring 41.

This cabling section 46 has a length which corresponds at least to the amplitude of the longitudinal movement of the shuttle 8 in the fixed section 7. This section 46 slackens from the section of the fixed drum 29 when the section 27 of the cable is unwound from the movable drum 36 through a slit 47 made in the drum casing 23, and said section 46 tightens around the fixed drum 29 when the section 27 of the flexible cabling winds again around the movable drum 36.

These arrangements enable all twisting of the cabling 15 to be avoided during the operation of the drum 19.

Figure 4:
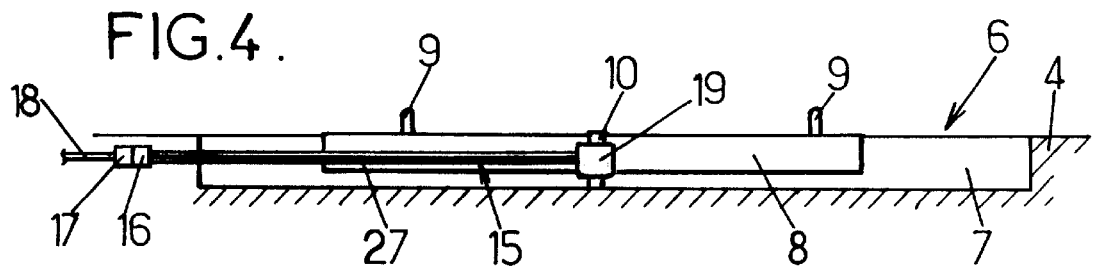
FIG. 4 is a diagrammatic view of a slide rail according to a second embodiment of the invention.

The second embodiment of the invention, which is shown in FIG. 4, is very similar to the embodiment described above, and will not therefore be described again in detail here.

It differs simply from the first embodiment explained above by the fact that the resilient return drum 19 is no longer fixed to the fixed section go the slide rail, but to the shuttle 8. The section 27 of the flexible cable 15 extends then from said drum to the connector 16 which is connected to the fixed electrical circuit situated in the vehicle floor.

In this case, the section 28 of the flexible cabling can possibly be removed or reduced to the strict minimum, since the connector 10 carried by the shuttle 8 can then be fixed directly on the drum 19, and in particular on the cover 30 of the fixed drum.

I claim:

1. A removable vehicle seat slide rail comprising:

a fixed section intended to be fixed with the vehicle floor and along which the seat can slide, this fixed section comprising first and second longitudinal ends and having at least one flange under which a free space is delimited, said flange extending from the first end to near the second end of the fixed section, and at least one shuttle sliding mounted relative to the fixed section and adapted to be connected to the vehicle seat so as to follow the movement of the seat along said fixed section, wherein the shuttle carries an electrical connection device intended to be connected to the seat, and in that the electrical connection device carried by said shuttle is itself connected to an electrical circuit integral with the vehicle floor at the first longitudinal end of the fixed section, by means of a flexible electrical cabling which is arranged under the flange of the fixed section and which is held taut by a resilient return drum.

2. A slide rail according to claim 1, in which, the flexible cabling is constituted by a layer of cables in the shape of a ribbon.

3. A slide rail according to claim 1, in which the resilient return drum comprises:

an inner fixed drum, fixed with the fixed section so as not to be able to rotate, a hollow movable drum which surrounds the fixed drum and which is mounted to rotate relative to said fixed drum, resilient means acting on the movable drum in a first angular direction, the flexible cabling having a first fixing point fixed with the movable drum, and said flexible cabling being subdivided into:

a first cabling section which extends around the fixed drum in a second angular direction opposite to the first angular direction from said first fixing point, and a second cabling section which extends around the movable drum in the second angular direction from said first fixing point.

4. A slide rail according to claim 3, in which the first cabling section extends to a second fixing point which is fixed with the fixed drum.

5. A slide rail according to claim 3, in which the movable drum is surrounded by a casing integral with the fixed drum.

6. A slide rail according to claim 1, in which the resilient return drum is fixed with the vehicle floor.

7. A slide rail according to claim 1, in which the resilient return drum is fixed with the shuttle.

8. A slide rail according to claim 1, in which the fixed section of the slide rail has an approximately U-shaped section open upwards, with two approximately vertical lateral flanges each extended inwards by an approximately horizontal flap, one of these flaps constituting the flange under which the flexible cabling is housed.

* * * * *